(12) United States Patent
Jean et al.

(10) Patent No.: US 11,449,398 B2
(45) Date of Patent: Sep. 20, 2022

(54) EMBEDDED CONTAINER-BASED CONTROL PLANE FOR CLUSTERED ENVIRONMENT

(71) Applicant: EMC IP Holding Company LLC, Hopkinton, MA (US)

(72) Inventors: Matthew Jean, Shirley, MA (US); Daniel K. O'Reilly, Framingham, MA (US); Richard Hicks, Cary, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 229 days.

(21) Appl. No.: 16/864,640

(22) Filed: May 1, 2020

(65) Prior Publication Data
US 2021/0342366 A1 Nov. 4, 2021

(51) Int. Cl.
*G06F 11/00* (2006.01)
*G06F 11/20* (2006.01)
*G06F 16/27* (2019.01)
*G06F 9/455* (2018.01)

(52) U.S. Cl.
CPC ...... *G06F 11/2028* (2013.01); *G06F 9/45558* (2013.01); *G06F 11/2041* (2013.01); *G06F 11/2048* (2013.01); *G06F 11/2094* (2013.01); *G06F 16/275* (2019.01); *G06F 2201/80* (2013.01)

(58) Field of Classification Search
CPC ......... G06F 16/27–278; G06F 11/0709; G06F 11/0712; G06F 11/0715; G06F 11/0724; G06F 11/2028; G06F 11/2041; G06F 11/2048; G06F 11/2094
See application file for complete search history.

(56) References Cited

U.S. PATENT DOCUMENTS

| 9,519,441 B1 | 12/2016 | Smith et al. |
| 10,001,939 B1 | 6/2018 | Gangadhar et al. |
| 10,599,611 B1 | 3/2020 | Dong et al. |
| 10,686,736 B1 | 6/2020 | Jiang et al. |

(Continued)

OTHER PUBLICATIONS

Kubernetes—Wikipedia, https://en.wikipedia.org/wiki/Kubernetes, Jul. 3, 2017 (Year: 2017).*

*Primary Examiner* — Michael Maskulinski
(74) *Attorney, Agent, or Firm* — BainwoodHuang

(57) ABSTRACT

Techniques for providing an embedded container-based control plane for clustered environments. A clustered storage system includes one to many storage appliances, in which one storage appliance is designated as a "primary appliance" and any other storage appliance(s) is/are designated as a "peer appliance(s)." The primary appliance includes a central database, one peer appliance includes a synchronously replicated database, and any other peer appliances each include an asynchronously replicated database. The primary appliance further includes a global management IP for managing access to the central database. The primary and peer appliances each further include a control plane container for implementing command processing services. The control plane container of the primary appliance further implements command orchestration services. The clustered storage system with central and replicated databases and a distributed control plane avoids the need to re-synchronize data at the time of storage appliance failure and improves scalability.

20 Claims, 7 Drawing Sheets

(56) References Cited

U.S. PATENT DOCUMENTS

| | | | |
|---|---|---|---|
| 10,782,997 B1 | 9/2020 | Krishna Murthy et al. | |
| 2006/0209678 A1* | 9/2006 | Vu | H04L 43/00 |
| | | | 370/216 |
| 2007/0220059 A1* | 9/2007 | Lu | G06F 16/2358 |
| 2017/0286238 A1* | 10/2017 | Kesavan | G06F 11/1666 |
| 2019/0116110 A1* | 4/2019 | Raney | H04L 43/12 |
| 2020/0036575 A1* | 1/2020 | Palavalli | G06F 11/2046 |

* cited by examiner

EMBEDDED CONTAINER-BASED CONTROL PLANE FOR CLUSTERED ENVIRONMENT

BACKGROUND

Clustered storage systems (also referred to herein as "clustered systems") employ various techniques to store, protect, and/or distribute electronic data and/or metadata across multiple storage appliances. Several approaches have been employed to manage and orchestrate distributed applications running on storage appliances in a clustered system. One approach involves routing all storage management requests to a separate management server and database. The management server processes the storage management requests and/or routes them to appropriate storage appliances in the clustered system. Another approach employs a clustered database that can be written to and/or read from by the respective storage appliances in the clustered system. Still another approach involves providing a primary database on one storage appliance and replicating data writes to one or more secondary databases on the other storage appliances in the clustered system.

SUMMARY

Unfortunately, the above approaches previously employed for managing and orchestrating distributed applications in clustered environments have drawbacks. For example, the approach that involves a separate management server and database can increase both costs and configuration and/or maintenance requirements of a clustered system. As the clustered system grows, processing and/or database resources necessary for management of the clustered system can outpace the existing resources, potentially requiring a costly replacement and/or upgrade of the management server. In this approach, it can also be difficult to maintain data synchronization across the respective storage appliances in the clustered system. The approach involving a clustered database likewise has drawbacks due to difficulties in maintaining data consistency across the respective storage appliances. Most clustered database configurations also require at least three storage appliances to maintain data consistency and/or handle storage appliance failures, forcing the clustered system to have at least three communicating storage appliances. In addition, the approach that involves providing a database on each storage appliance can have drawbacks due to delays (also known as "replication lag") between times when transactions are performed at a primary database to when transactional writes are initiated to secondary databases in the clustered system.

Techniques are disclosed herein for providing an embedded container-based control plane for clustered environments. The disclosed techniques can address at least some of the drawbacks of prior approaches to management and orchestration of distributed applications within clustered systems. In the disclosed techniques, a clustered system is provided that can include one to many storage appliances. Among the storage appliances in the clustered system, one storage appliance can be designated as a "primary appliance," and one or more other storage appliances (if any) can be designated as "peer appliances." The primary appliance can include a central management database (also referred to herein as the "central database") and the peer appliances can each include a replicated management database (also referred to herein as the "replicated database(s)"). The replicated database on one of the peer appliances can be synchronized with the central database on the primary appliance in a synchronous fashion, and the replicated database(s) on the other peer appliance(s) can be synchronized with the central database on the primary appliance in an asynchronous fashion. The primary appliance can further include a global management IP for managing access to the central database by the respective peer appliances. The primary appliance and peer appliances can each further include a control plane container configured to implement command processing services. The control plane container of the primary appliance can be further configured to implement command orchestration services, which can orchestrate execution of commands across the respective storage appliances in the clustered system in a distributed fashion.

As will be seen in this disclosure, by providing a central database on a primary appliance of a clustered system, synchronously replicating the central database to a peer appliance of the clustered system, and asynchronously replicating the central database to any remaining peer appliance(s) of the clustered system, the need to re-synchronize data at the time of storage appliance failure can be avoided and the scalability of the clustered system can be improved. Moreover, by providing a container-based control plane to implement command processing services across the respective primary and peer appliances, command processing can be performed in a distributed fashion, thereby further improving the scalability of the clustered system.

In certain embodiments, a method of a clustered storage system includes storing, in a central database of a primary appliance of the clustered storage system, one or more commands for satisfying one or more storage management requests. The method further includes synchronously replicating the central database to a first peer database of a first peer appliance of the clustered storage system, and performing distributed processing of the stored commands within a container-based control plane across at least the primary appliance and the first peer appliance of the clustered storage system.

In certain arrangements, the method further includes receiving the one or more storage management requests at a global management IP address of the primary appliance.

In certain arrangements, the method further includes accessing, by the first peer appliance via the global management IP address, at least some of the one or more commands stored in the central database of the primary appliance.

In certain arrangements, each of the primary appliance and the first peer appliance includes a control plane container having command processing services implemented therein, and the control plane container of the primary appliance further has command orchestration services implemented therein. The method further includes orchestrating, by the command orchestration services, execution of at least some of the stored commands across the control plane container of the primary appliance and the control plane container of the first peer appliance.

In certain arrangements, the method further includes asynchronously replicating the central database to a second peer database of a second peer appliance of the clustered storage system.

In certain arrangements, the method further includes detecting a failure of the primary appliance.

In certain arrangements, the method further includes, in response to the failure of the primary appliance, promoting the first peer appliance to a role of a first new primary appliance.

In certain arrangements, the method further includes, having promoted the first peer appliance to the role of the first new primary appliance, spinning up at least first command orchestration and processing services within a first control plane container of the first peer appliance.

In certain arrangements, the method further includes synchronously replicating the first peer database of the first peer appliance to the second peer database of the second peer appliance.

In certain arrangements, the method further includes detecting a failure of the first peer appliance.

In certain arrangements, the method further includes, in response to the failure of the first peer appliance, promoting the second peer appliance to a role of a second new primary appliance.

In certain arrangements, the method further includes, having promoted the second peer appliance to the role of the second new primary appliance, spinning up at least second command orchestration and processing services within a second control plane container of the second peer appliance.

In certain embodiments, a clustered storage system includes a primary appliance including a central database, in which the central database is configured to store one or more commands for satisfying one or more storage management requests. The clustered storage system further includes zero or more peer appliances, in which each peer appliance includes a replicated database, the replicated database being a replicated version of the central database. Each of the primary appliance and the peer appliance includes a control plane container for implementing a container-based control plane across the primary appliance and the peer appliance. The container-based control plane is configured to perform distributed processing of the stored commands across at least the primary appliance and the peer appliance.

In certain arrangements, the primary appliance has an associated global management IP address, and is configured to receive the one or more storage management requests at the global management IP address.

In certain arrangements, the peer appliance is configured to access the central database of the primary appliance via the global management IP address.

In certain arrangements, the primary appliance includes a first control plane container, and the peer appliance includes a second control plane container.

In certain arrangements, each of the first control plane container and the second control plane container is configured to run within a separate virtual machine.

In certain arrangements, the first control plane container is configured to implement at least command orchestration and processing services. The command orchestration and processing services of the first control plane container are configured to run within the same virtual machine.

In certain embodiments, a computer program product includes a set of non-transitory, computer-readable media having instructions that, when executed by storage processing circuitry, cause the storage processing circuitry to perform a method including storing, in a central database of a primary appliance of a clustered storage system, one or more commands for satisfying one or more storage management requests. The method further includes synchronously replicating the central database to a peer appliance of the clustered storage system, and performing distributed processing of the stored commands within a container-based control plane across at least the primary appliance and the peer appliance of the clustered storage system.

In certain arrangements of the computer program product, the method further includes receiving the one or more storage management requests at a global management IP address of the primary appliance, and accessing, by the peer appliance via the global management IP address, the one or more commands stored in the central database of the primary appliance.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

FIG. 1b is a block diagram of an exemplary storage appliance included in the clustered system of FIG. 1a;

DETAILED DESCRIPTION

Techniques are disclosed herein for providing an embedded container-based control plane for clustered environments. In the disclosed techniques, a clustered system is provided that can include one to many storage appliances, in which one storage appliance is designated as a "primary appliance" and any other storage appliance(s) is/are designated as a "peer appliance(s)." The primary appliance can include a central management database (also referred to herein as the "central database"), one peer appliance can include a synchronously replicated database, and any other peer appliances can each include an asynchronously replicated database. The primary appliance can further include a global management IP for managing access to the central database by the respective peer appliances. The primary and peer appliances can each further include a control plane container for implementing command processing services. The control plane container of the primary appliance can further implement command orchestration services. By providing a central database on the primary appliance, a synchronously replicated database on one peer appliance, and asynchronously replicated databases on any remaining peer appliances in the clustered system, the need to re-synchronize data at the time of storage appliance failure can be avoided and the scalability of the clustered system can be improved. Moreover, by providing a distributed container-based control plane to implement command orchestration services on the primary appliance and command processing services across the primary and peer appliances, the scalability of the clustered system can be further improved.

Figure 1A:
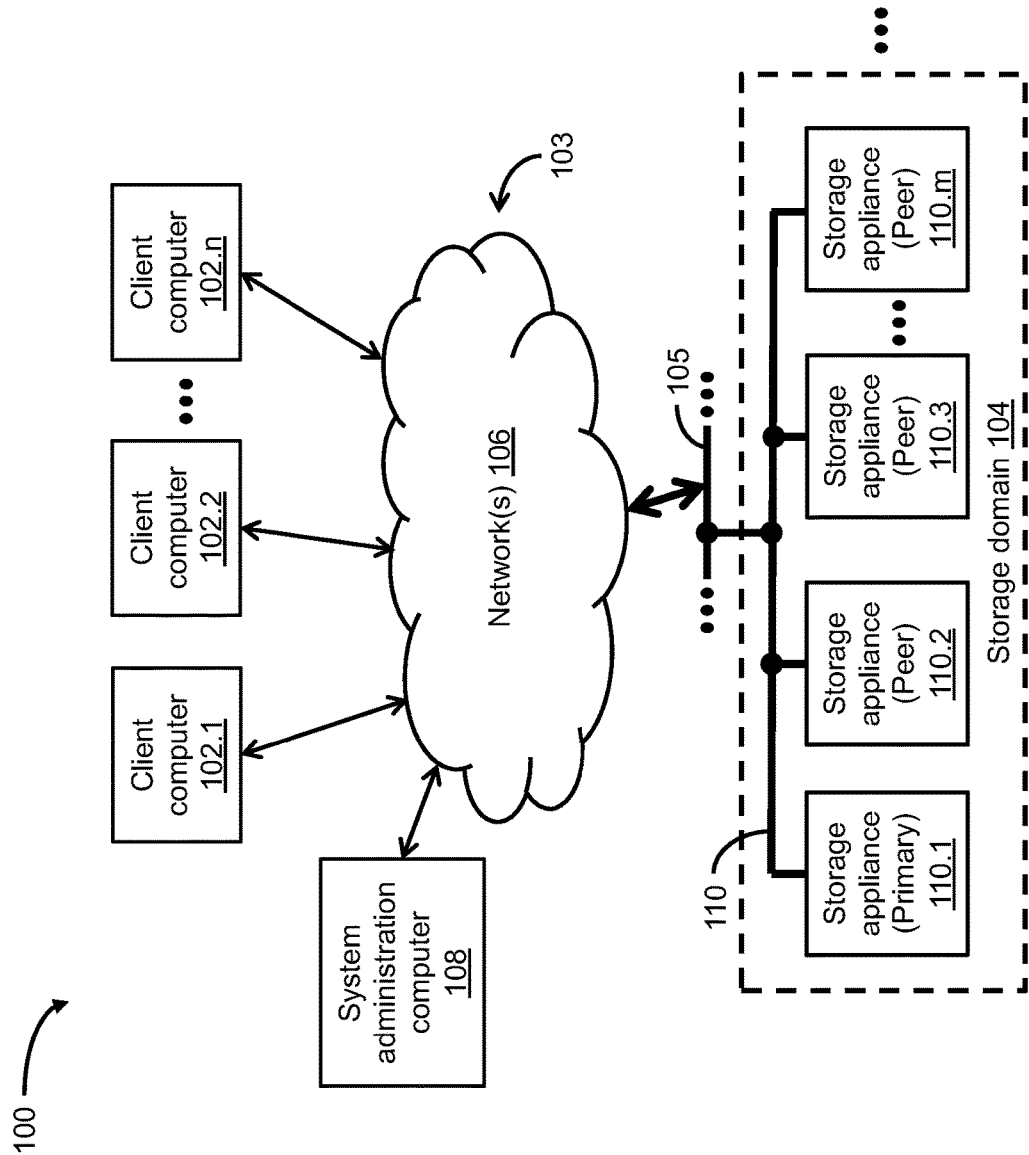
FIG. 1a is a block diagram of an exemplary clustered storage environment, in which techniques can be practiced for providing an embedded container-based control plane in a clustered system.

FIG. 1a depicts an illustrative embodiment of an exemplary clustered storage environment 100, in which techniques can be practiced for providing an embedded container-based control plane and replicated databases in a clustered system. As shown in FIG. 1a, the clustered storage environment 100 can include a plurality of client computers 102.1, 102.2, . . . , 102.n, at least one storage domain 104, and a system administrator computer 108, which are interconnected by a communications medium 103 that includes at least one network 106. For example, each of the plurality of client computers 102.1, . . . , 102.n can be configured as a web server computer, a file server computer, an email server computer, an enterprise server computer, or any other suitable client or server computer or computerized device. Further, the system administrator computer 108 can be remote from (or local to) the storage domain 104 within the clustered storage environment 100.

As further shown in FIG. 1a, the storage domain 104 can include, as members of the storage domain 104, a plurality of storage appliances 110.1, 110.2, 110.3, . . . , 110.m. In the storage domain 104, the storage appliance 110.1 can be elected or otherwise designated to perform (at least temporarily) the role of a primary appliance, while each of the remaining storage appliances 110.2, 110.3, . . . , 110.m perform (at least temporarily) the role of a secondary appliance. The storage domain 104 can further include a local area network (LAN) 110 such as an Ethernet network or any other suitable network, which is configured to interconnect the plurality of storage appliances 110.1, . . . , 110.m. It is noted that a plurality of LANs (like the LAN 110) included in a plurality of storage domains (like the storage domain 104) can be interconnected by a network 105, such as a metropolitan area network (MAN), a wide area network (WAN), or any other suitable network.

Within the clustered storage environment 100 of FIG. 1a, the system administrator computer 108 can be configured to execute program instructions to enable a system administrator or other user to create, define, map, and/or configure at least one property, aspect, object, and/or entity of the storage domain 104 by issuing one or more storage management requests to a respective one of the storage appliances 110.1, . . . , 110.m (e.g., the storage appliance (primary) 110.1). For example, the system administrator can issue storage management requests to perform management operations such as (i) creating, defining, mapping, and/or configuring logical entities such as logical units (LUNs), logical volumes (LVs), groups of LUNs or LVs, and so on, and/or (ii) creating or attaching host systems, mapping LUNs, and so on. Such a storage management request can be issued in the form of a Representational State Transfer (REST) application programming interface (API) call to the primary appliance 110.1, which can perform processing to service the storage management request, as well as return a response including configuration data or information pertaining to the storage domain 104 or any other suitable data or information.

The plurality of client computers 102.1, . . . , 102.n can be configured to provide, over the network 106, storage input/output (IO) requests (e.g., small computer system interface (SCSI) commands, network file system (NFS) commands) to the respective storage appliances (primary or peer) 110.1, . . . , 110.m of the storage domain 104. For example, such storage IO requests (e.g., write requests, read requests) can direct the respective storage appliances (primary or peer) 110.1, . . . , 110.m to write and/or read data pages, data blocks, data files, and/or any other suitable data elements to/from LUNs, LVs, file systems, and/or any other suitable storage objects (also referred to herein as "domain objects" or "cluster domain objects") stored in association with the respective storage appliances 110.1, . . . , 110.m of the storage domain 104.

The communications medium 103 can be configured to interconnect the plurality of client computers 102.1, . . . , 102.n with the respective storage appliances 110.1, . . . , 110.m of the storage domain 104 to enable them to communicate and exchange data and/or control signaling. As shown in FIG. 1a, the communications medium 103 is illustrated as a "cloud" to represent a variety of different communications topologies such as a backbone topology, a hub-and-spoke topology, a loop topology, an irregular topology, or any suitable combination thereof. As such, the communications medium 103 can include copper-based communications devices and cabling, fiber optic communications devices and cabling, wireless communications devices, or any suitable combination thereof. Further, the communications medium 103 can be configured to support storage area network (SAN)-based communications, network attached storage (NAS)-based communications, LAN-based communications, MAN-based communications, WAN-based communications, wireless communications, distributed infrastructure communications, and/or any other suitable fiber, wired, and/or wireless communications.

Figure 1C:
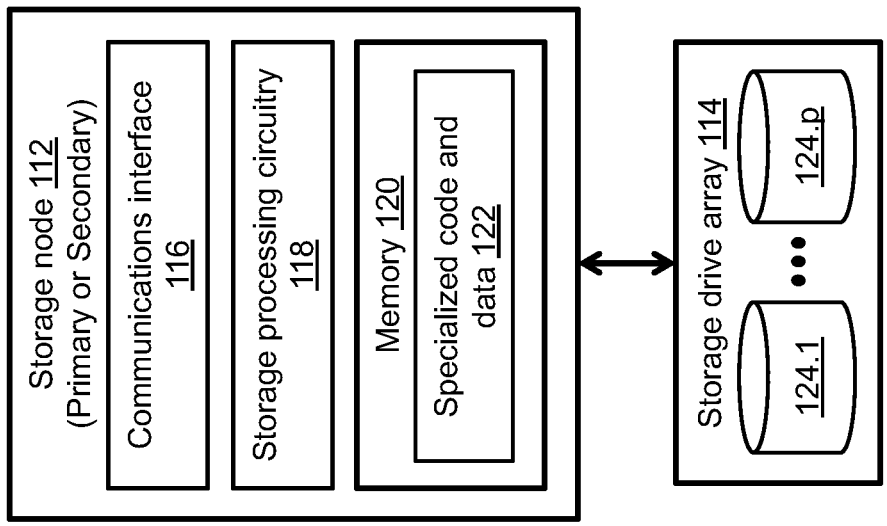
FIG. 1c is a block diagram of an exemplary storage node included in the storage appliance of FIG. 1b, as well as an exemplary storage drive array coupled to the storage node.
Figure 1B:
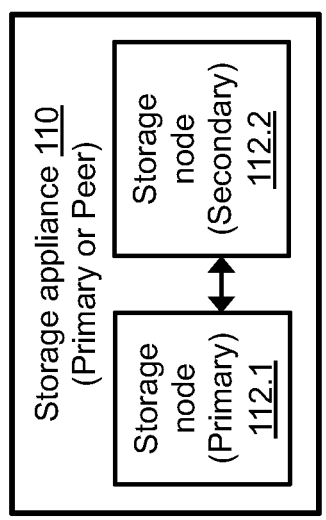

FIG. 1b depicts an exemplary storage appliance 110 included in the storage domain 104 of FIG. 1a. It is noted that each of the storage appliances (primary or peer) 110.1, . . . , 110.m included in the storage domain 104 can be configured like the storage appliance 110 of FIG. 1b. As shown in FIG. 1b, the storage appliance 110 can include two (2) storage nodes 112.1, 112.2 for providing high availability (HA) within the clustered storage environment 100. In the storage appliance 110, the storage node 112.1 can be elected or otherwise designated to perform (at least temporarily) the role of a primary node, while the storage node 112.2 performs (at least temporarily) the role of a secondary node. For example, the storage node (primary) 112.1 can (i) receive storage IO requests (e.g., write requests, read requests) from one or more of the client computers 102.1, . . . , 102.n over the network 106, (ii) in response to the storage IO requests, write and/or read data pages, data blocks, data files, and/or any other suitable data elements to/from one or more LUNs, LVs, file systems, and/or any other suitable storage objects stored in association with the storage node (primary) 112.1, and, (iii) at least at certain time intervals, synchronize data stored in association with the storage node (primary) 112.1 with corresponding data stored in association with the storage node (secondary) 112.2. In the event of a failure of the storage node (primary) 112.1, the storage node (secondary) 112.2 can assume the role of the primary node, providing high availability within the clustered storage environment 100.

FIG. 1c depicts an exemplary storage node 112 included in the storage appliance 110 of FIG. 1b. It is noted that each of the storage nodes (primary and secondary) 112.1, 112.2 of FIG. 1b can be configured like the storage node 112 of FIG. 1c. As shown in FIG. 1c, the storage node 112 can include a communications interface 116, storage processing circuitry 118, and a memory 120. The communications interface 116 can include SCSI target adapters, network interface adapters, and/or any other suitable adapters for converting electronic, wireless, and/or optical signals received over the network 106 to a form suitable for use by the storage processing circuitry 118. The memory 120 can include persistent memory (e.g., flash memory, magnetic memory) and non-persistent memory (e.g., dynamic random-access memory (DRAM), static random-access memory (SRAM)) and can accommodate specialized code and data 122 for implementing a variety of software constructs to carry out the techniques disclosed herein.

The storage drive array 114 can include a plurality of storage drives 124.1, . . . , 124.p such as magnetic disk drives, electronic flash drives, optical drives, and/or any other suitable storage drives. The storage drive array 114 can be locally attached to an IO channel of the storage node 112, while also being accessible over the network 106. In certain embodiments, the storage drive array 114 can be implemented as a dual-port drive, which can be shared between the storage node (primary) 112.1 and the storage node (secondary) 112.2 of the storage appliance 110.

The storage processing circuitry 118 can include one or more physical storage processors or engines (e.g., running specialized software), data movers, director boards, blades, IO modules, storage drive controllers, switches, and/or any other suitable computer hardware or combination thereof. For example, the storage processing circuitry 118 can process storage management requests issued by the system administrator computer 108, as well as storage IO requests (e.g., write requests, read requests) issued by the client computers 102.1, . . . , 102.n over the network 106.

In the context of the storage processing circuitry 118 being implemented using one or more processors running specialized software, a computer program product can be configured to deliver all or a portion of the software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the techniques disclosed herein.

Figure 2A:
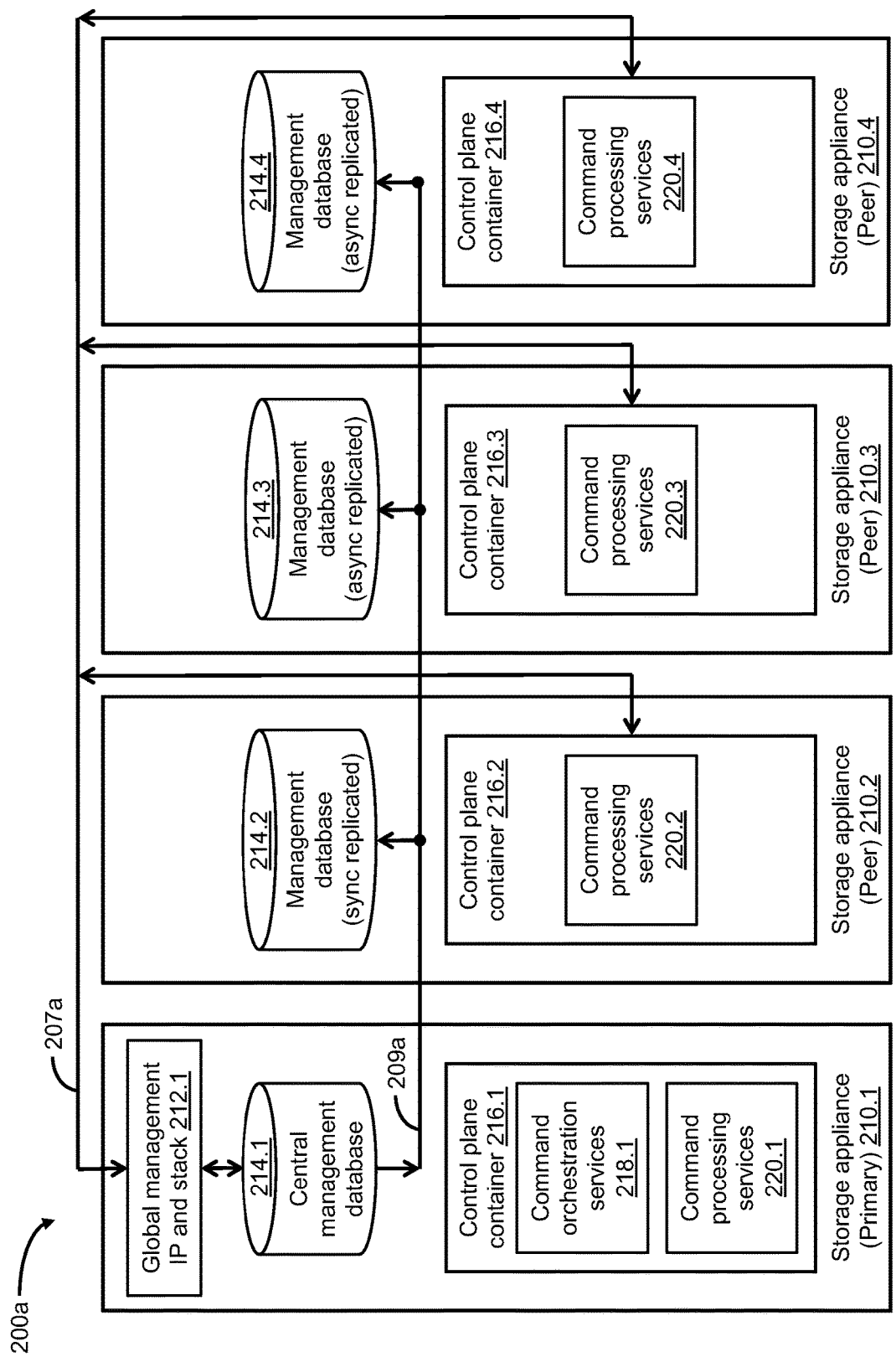
FIG. 2a is a block diagram of the clustered system of FIG. 1a, in which the clustered system includes an exemplary primary appliance and three (3) exemplary peer appliances.

FIG. 2a depicts an exemplary clustered system 200a that includes four (4) storage appliances 210.1, 210.2, 210.3, 210.4. During operation of the clustered system 200a, the storage appliance 210.1 can be designated as the "primary appliance," and the storage appliances 210.2, 210.3, 210.4 can be designated as the "peer appliances." As shown in FIG. 2a, the primary appliance 210.1 can include a central management database ("central database") 214.1, and the peer appliances 210.2, 210.3, 210.4 can include replicated management databases ("replicated databases") 214.2, 214.3, 214.4, respectively. In certain embodiments, the replicated database on one of the peer appliances (e.g., the replicated database 214.2 on the peer appliance 210.2) can be synchronized over a path 209a with the central database 214.1 on the primary appliance 210.1 in a synchronous fashion. Further, the replicated database(s) on the other peer appliance(s) (e.g., the replicated databases 214.3, 214.4 on the peer appliances 210.3, 210.4, respectively) can be synchronized over the path 209a with the central database 214.1 on the primary appliance 210.1 in an asynchronous fashion.

The primary appliance 210.1 can further include a global management IP and stack 212.1 for managing access to the central database 214.1 over a path 207a by the respective peer appliances 210.2, 210.3, 210.4. The storage appliances 210.1, 210.2, 210.3, 210.4 can further include control plane containers 216.1, 216.2, 216.3, 216.4, respectively, which are configured to implement command processing services 220.1, 220.2, 220.3, 220.4 on the storage appliances 210.1, 210.2, 210.3, 210.4, respectively. The control plane container 216.1 of the primary appliance 210.1 can be further configured to implement command orchestration services 218.1, which can orchestrate processing of commands across the respective storage appliances 210.1, 210.2, 210.3, 210.4 in a distributed fashion.

The operation of the exemplary clustered system 200a within the clustered storage environment 100 will be further understood with reference to the following illustrative example, as well as FIGS. 1a and 2a-2d. In this example, a system administrator using the system administrator computer 108 (see FIG. 1a) issues, via a REST API, at least one storage management request to create, define, map, and/or configure at least one property, aspect, object, and/or entity of the storage domain 104. Once issued, the storage management request enters the clustered system 200a (see FIG. 2a) via the global management IP and stack 212.1, which provides an API gateway to the primary appliance 210.1. In certain embodiments, the global management IP (see FIG. 2a, reference numeral 212.1) can correspond to an IP address that effectively abstracts the location of the central database 214.1 from the peer appliances 210.2, 210.3, 210.4. For example, the IP address can be initialized on an Ethernet port of either the primary node or the secondary node of the primary appliance 210.1. Each of the peer appliances 210.2, 210.3, 210.4 can access the IP address of the primary appliance 210.1 to communicate with the central database 214.1. In certain embodiments, the management stack (see also FIG. 2a, reference numeral 212.1) can correspond to a software application configured to perform management-related operations for creating, defining, mapping, and/or configuring particular properties, aspects, objects, and/or entities of the storage domain 104. The management stack is further configured to populate and/or maintain the central database 214.1 on the primary appliance 210.1, which stores command data relating to various storage management requests issued by the system administrator.

Having received the storage management request at the primary appliance 210.1 via the global management IP (see FIG. 2a, reference numeral 212.1), the management stack (see also FIG. 2a, reference numeral 212.1) writes or persists, to the central database 214.1, data pertaining to one or more commands to be performed or processed for satisfying the storage management request. As described herein, the replicated database on one of the peer appliances (e.g., the replicated database 214.2 on the peer appliance 210.2) can be synchronized over the path 209a with the central database 214.1 in a synchronous fashion. To that end, each time the management stack writes or persists data to the central database 214.1, the same data is written or persisted to the replicated database 214.2 of the peer appliance 210.2 at substantially the same time. For example, at the time when the management stack writes or persists the data to the central database 214.1, the same data is sent from the primary appliance 210.1 over the path 209a to the replicated database 214.2 of the peer appliance 210.2. Once the data has been successfully written or persisted to the replicated database 214.2, the peer appliance 210.2 sends a reply over the path 209a back to the primary appliance 210.1. As further described herein, the replicated database(s) on the other peer appliance(s) (e.g., the replicated databases 214.3, 214.4 on the peer appliances 210.3, 210.4, respectively) can be synchronized over the path 209*a* with the central database 214.1 in an asynchronous fashion. Unlike synchronous replication, asynchronous replication can result in a delay before the data gets successfully written or persisted to the replicated databases 214.3, 214.4 on the peer appliances 210.3, 210.4, respectively.

Once the commands for satisfying the storage management request are written or persisted to the central database 214.1, the command orchestration services 218.1 implemented in the control plane container 216.1 of the primary appliance 210.1 routes (e.g., via a TCP/IP connection) none, some, or all of the commands to the appropriate control plane containers 216.2, 216.3, 216.4 of the peer appliances 210.2, 210.3, 210.4, respectively, for processing in a distributed fashion. For example, if a command corresponds to a storage management request for a domain object that has an ownership attribute identifying a peer appliance as the owner of the domain object, then the command can be routed to the control plane container of the identified peer appliance for processing. Alternatively, if a command corresponds to a storage management request for a domain object that is associated with the cluster of storage appliances 210.1, 210.2, 210.3, 210.4 as a whole, then the command can be routed to the control plane container of the primary appliance 210.1 for processing. Having routed some of the commands to the appropriate peer appliances 210.2, 210.3, 210.4, the command processing services 220.1, 220.2, 220.3, 220.4 implemented in the control plane containers 216.1, 216.2, 216.3, 216.4 of the storage appliances 210.1, 210.2, 210.3, 210.4, respectively, can process the commands in a distributed fashion. In this way, the storage appliances 210.1, 210.2, 210.3, 210.4 of the clustered system 200*a* can perform distributed processing of the commands that have been written or persisted to the central database 214.1 of the primary appliance 210.1.

In certain embodiments, the control plane containers 216.1, 216.2, 216.3, 216.4 of the storage appliances 210.1, 210.2, 210.3, 210.4, respectively, can each be implemented on a container platform provided by Docker® Inc., Palo Alto, Calif. USA, a Linux® Container (LXC) platform, or any other suitable container platform. Linux® is a registered trademark of Linus Torvalds in the USA and other countries. Further, each of the control plane containers 216.1, 216.2, 216.3, 216.4 can be configured to run on the respective storage appliances 210.1, 210.2, 210.3, 210.4 within a separate virtual machine (VM), such as a Java® Virtual Machine (JVM) or any other suitable virtual machine. Java® is a trademark of Oracle® Corporation, Redwood Shores, Calif. USA. In such embodiments, the command orchestration services 218.1, the command processing services 220.1, 220.2, 220.3, 220.4, and/or any other suitable services can each be implemented as a microservice configured to run on the platform of one of the control plane containers 216.1, 216.2, 216.3, 216.4. In a microservice architecture, software systems can be composed of small, decoupled processes (also referred to herein as "microservices"), each of which can provide a specific functionality focused on one type of task, such as command orchestration tasks, command processing tasks, concurrency control and locking tasks, infrastructure-related tasks, and so on. In each of the control plane containers 216.1, 216.2, 216.3, 216.4, multiple microservices can be configured to run within the same JVM, thereby allowing the creation of a dependency framework that facilitates the handling of storage appliance failures within the clustered system 200*a*.

Figure 2B:
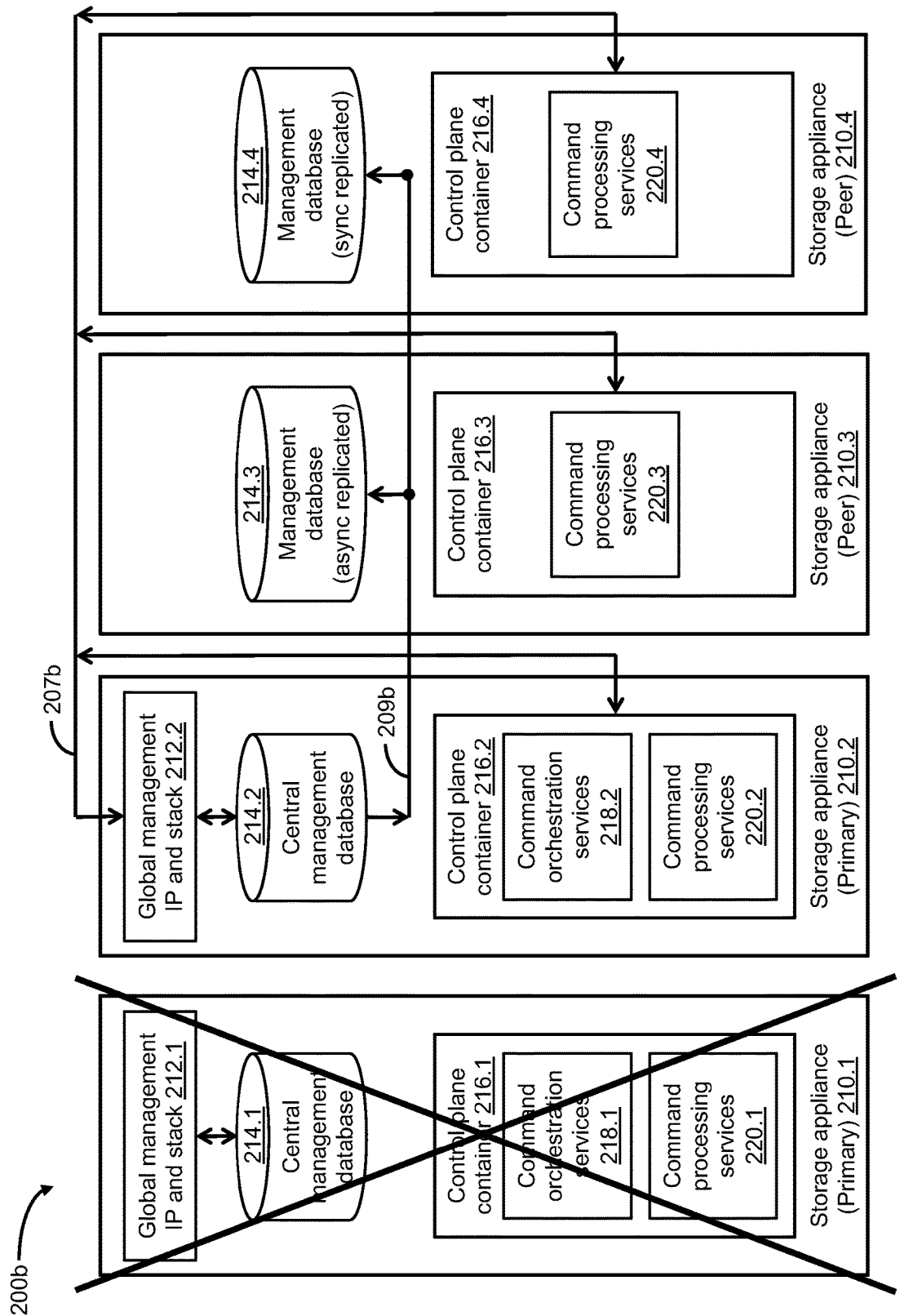
FIG. 2b is a block diagram of the clustered system of FIG. 2a, in which the primary appliance has experienced a failure, and one of the three (3) peer appliances has been promoted to the role of a first new primary appliance.

In this example, it is assumed that the primary appliance 210.1 of the clustered system 200*a* is subjected to or otherwise experiences a failure (e.g., a hardware or software failure), and one of the three (3) peer appliances 210.2, 210.3, 210.4 is promoted to the role of a first new primary appliance. FIG. 2*b* depicts a clustered system 200*b*, in which the storage appliance 210.1 has experienced a failure (as indicated by a cross, "X"), and the storage appliance 210.2 has been promoted to the role of the first new primary appliance. As shown in FIG. 2*b*, the storage appliances 210.3, 210.4 each remain in the role of a peer appliance. As described herein, the replicated database 214.2 on the peer appliance 210.2 can be synchronized with the central database 214.1 over the path 209*a* in a synchronous fashion, and the replicated databases 214.3, 214.4 on the peer appliances 210.3, 210.4, respectively, can be synchronized with the central database 214.1 over the path 209*a* in an asynchronous fashion. Because synchronous replication of the central database 214.1 has been performed at the peer appliance 210.2 (i.e., there was essentially no delay in writing or persisting the data from the central database 214.1 to the replicated database 214.2), the replicated database 214.2 is assumed to contain the most up-to-date copy of the central database 214.1. For at least this reason, the peer appliance 210.2 can be chosen over each of the peer appliances 210.3, 210.4 for promotion to the role of the first new primary appliance.

Once the peer appliance 210.2 has been promoted to the role of the first new primary appliance, the global management IP and stack (see FIG. 2*b*, reference numeral 212.2) are established on the primary appliance 210.2, and the replicated database 214.2 takes on the role of a first new central management database ("central database"). Further, command orchestration services (see FIG. 2*b*, reference numeral 218.2) and any other suitable services (e.g., concurrency control and locking services, infrastructure-related services) are "spun-up" or otherwise started within the same JVM of the control plane container 216.2. As described herein, running multiple microservices within the same JVM can allow the creation of a dependency framework that facilitates the handling of storage appliance failures within a clustered system. In certain embodiments, upon detection of a failure of the storage appliance 210.1 and the promotion of the storage appliance 210.2 to the role of a new primary appliance, such a dependency framework can cause one or more "config state" events or any other suitable events or notifications to be generated and sent to the control plane container 216.2 of the storage appliance 210.2. Such config state events can, in turn, cause the command orchestration services 218.2 (and any other suitable services) to spin-up or start within the control plane container 216.2, thereby effectively morphing or otherwise transforming the storage appliance 210.2 from a peer appliance to the new primary appliance of the clustered system 200*b*.

Once the storage appliance 210.2 has been morphed or transformed into the first new primary appliance of the clustered system 200*b*, the global management IP and stack 212.2 of the storage appliance 210.2 can manage access to the central database 214.2 over a path 207*b* by the respective peer appliances 210.2, 210.3, 210.4. Further, the replicated database on one of the peer appliances (e.g., the replicated database 214.4 on the peer appliance 210.4) can be synchronized with the central database 214.2 on the primary appliance 210.2 over a path 209*b* in a synchronous fashion, and the replicated database on the other peer appliance (e.g., the replicated database 214.3 on the peer appliance 210.3) can be synchronized with the central database 214.2 on the primary appliance 210.2 over the path 209b in an asynchronous fashion.

Figure 2C:
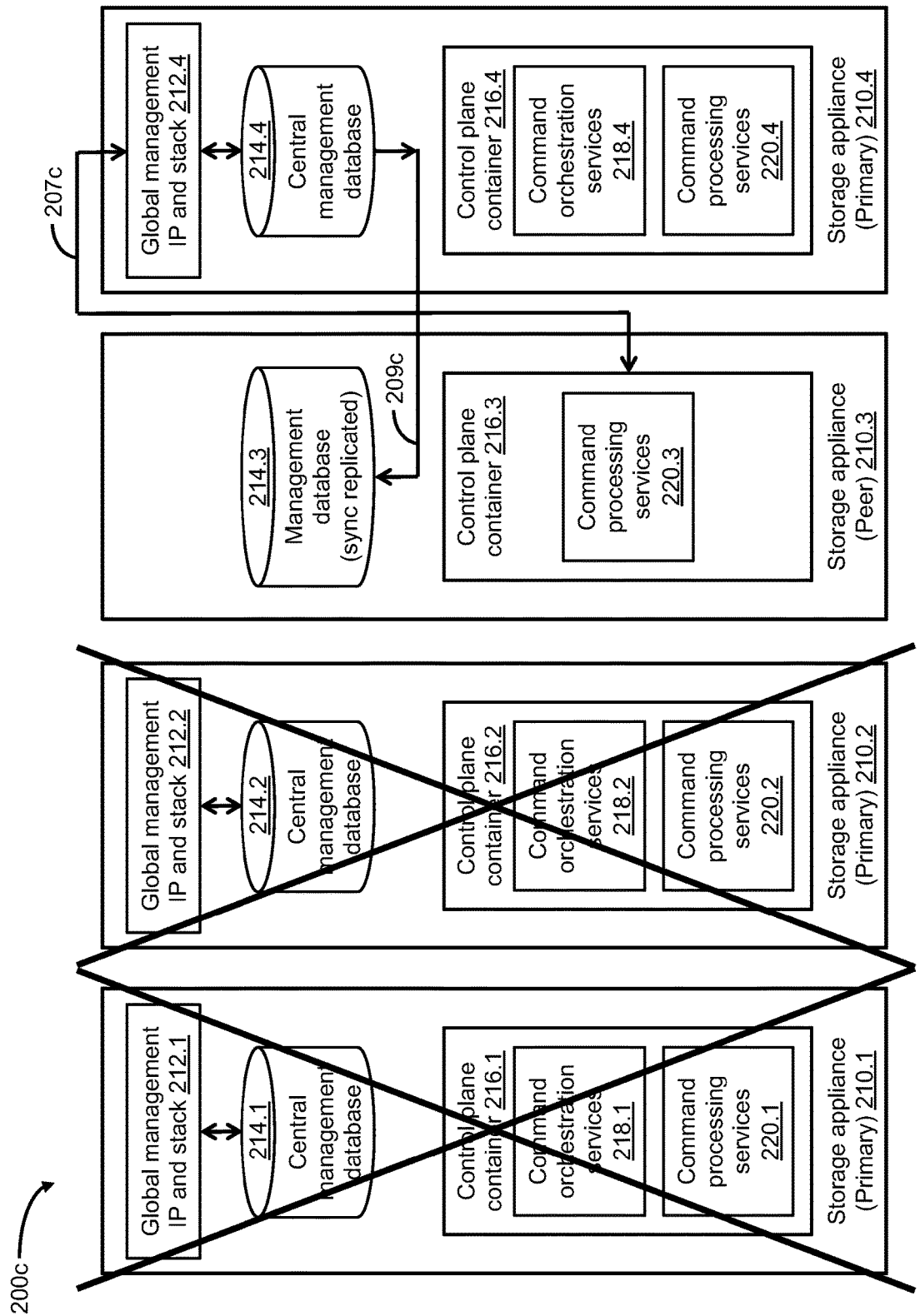
FIG. 2c is a block diagram of the clustered system of FIG. 2b, in which the previously promoted peer appliance has likewise experienced a failure, and one of the remaining two (2) peer appliances has been promoted to the role of a second new primary appliance.

In this example, it is assumed that the primary appliance 210.2 of the clustered system 200b likewise experiences a failure (e.g., a hardware or software failure), and one of the two (2) peer appliances 210.3, 210.4 is promoted to the role of a second new primary appliance. FIG. 2c depicts a clustered system 200c, in which each of the storage appliances 210.1, 210.2 has failed (as indicated by two (2) crosses, "X"), and the storage appliance 210.4 has been promoted to the role of the second new primary appliance. As shown in FIG. 2c, the storage appliance 210.3 remains in the role of a peer appliance. Because synchronous replication of the central database 214.2 has been performed at the peer appliance 210.4 (i.e., there was no delay in writing or persisting the data from the central database 214.2 to the replicated database 214.4), the replicated database 214.4 is assumed to contain the most up-to-date copy of the central database 214.2. For at least this reason, the peer appliance 210.4 can be chosen over the peer appliance 210.3 for promotion to the role of the second new primary appliance.

Once the peer appliance 210.4 has been promoted to the role of the second new primary appliance, the global management IP and stack (see FIG. 2c, reference numeral 212.4) are established on the primary appliance 210.4, and the replicated database 214.4 takes on the role of a second new central management database ("central database"). Further, command orchestration services (see FIG. 2c, reference numeral 218.4) and any other suitable services (e.g., concurrency control and locking services, infrastructure-related services) are spun-up or otherwise started within the same JVM of the control plane container 216.4, due to one or more config state events being generated and sent to the control plane container 216.4. Having spun-up or started the command orchestration services 218.4 (and any other suitable services) within the control plane container 216.4, the storage appliance 210.4 effectively morphs or otherwise transforms from a peer appliance to the second new primary appliance of the clustered system 200c. As such, the global management IP and stack 212.4 of the storage appliance 210.4 can manage access to the central database 214.4 over a path 207c by the peer appliance 210.3, and the replicated database 214.3 on the peer appliance 210.3 can be synchronized with the central database 214.4 over a path 209b in a synchronous fashion.

Figure 2D:
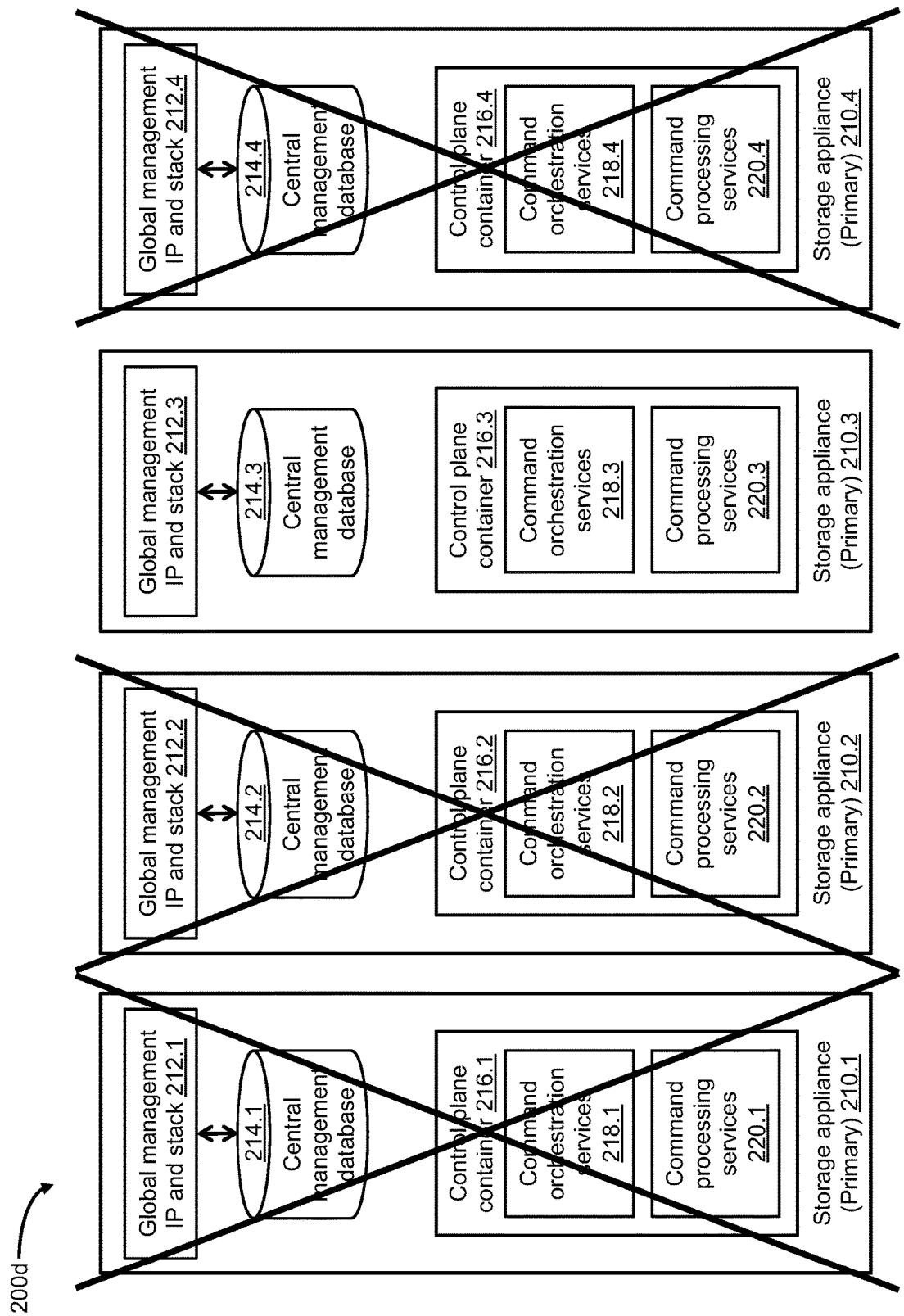
FIG. 2d is a block diagram of the clustered system of FIG. 2c, in which the second promoted peer appliance has also experienced a failure, and the remaining peer appliance has been promoted to the role of a third new primary appliance.

In this example, it is assumed that the primary appliance 210.4 of the clustered system 200c also experiences a failure (e.g., a hardware or software failure), leaving the peer appliance 210.3 as the sole operating storage appliance in the clustered system 200c. FIG. 2d depicts a clustered system 200d, in which each of the storage appliances 210.1, 210.2, 210.4 has failed (as indicated by three (3) crosses, "X"). In certain embodiments, the single storage appliance 210.3 (which includes the sync replicated database 214.3) can be promoted to the role of a third new primary appliance, awaiting one or more peer appliances to be added to the clustered system 200d and/or one or more of the storage appliances 210.1, 210.2, 210.4 to return to an operative state.

Once the peer appliance 210.3 has been promoted to the role of the third new primary appliance, the global management IP and stack (see FIG. 2d, reference numeral 212.3) are established on the primary appliance 210.3, and the replicated database 214.3 takes on the role of a third new central management database ("central database"). Further, command orchestration services (see FIG. 2d, reference numeral 218.3) and any other suitable services (e.g., concurrency control and locking services, infrastructure-related services) are spun-up or otherwise started within the same JVM of the control plane container 216.3, due to one or more config state events being generated and sent to the control plane container 216.3. Having spun-up or started the command orchestration services 218.3 (and any other suitable services) within the control plane container 216.3, the storage appliance 210.3 effectively morphs or transforms from a peer appliance to the third new primary appliance of the clustered system 200d.

By providing a central database on a primary appliance of a clustered system, synchronously replicating the central database to a peer appliance of the clustered system, and asynchronously replicating the central database to any remaining peer appliance(s) of the clustered system, the need to re-synchronize data at the time of storage appliance failure is avoided and the scalability of the clustered system is improved. Moreover, by providing a container-based control plane to implement command processing services across the respective primary and peer appliances, command processing can be performed in a distributed fashion, thereby further improving the scalability of the clustered system.

Figure 3:
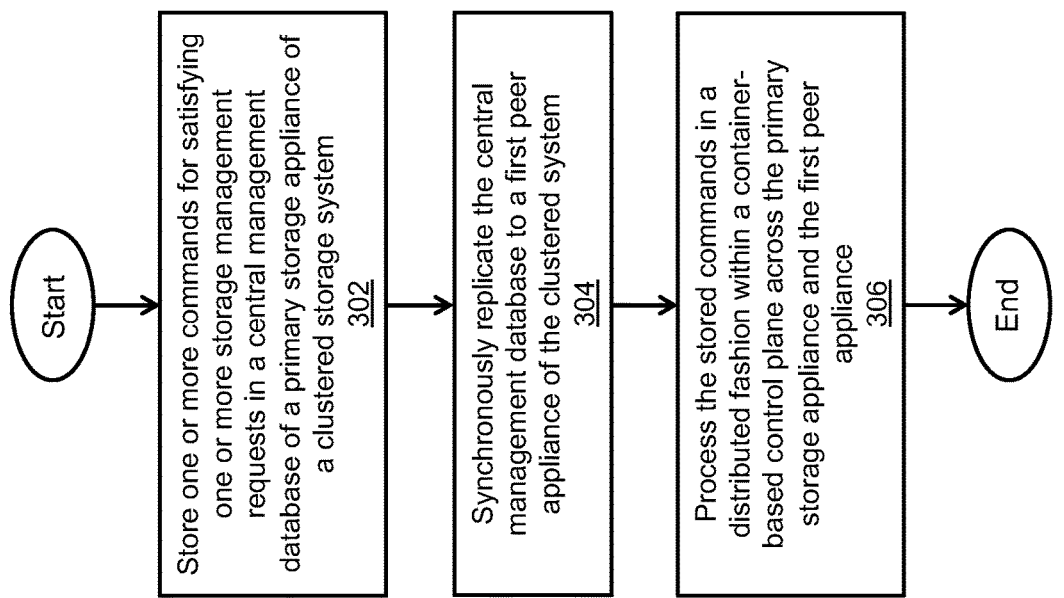
FIG. 3 is a flow diagram of an exemplary method of a clustered system that includes an embedded container-based control plane.

An illustrative method of a clustered system that includes an embedded container-based control plane is described below with reference to FIG. 3. As depicted in block 302, one or more commands for satisfying one or more storage management requests are stored in a central management database of a primary storage appliance of a clustered storage system. As depicted in block 304, the central management database is synchronously replicated to a first peer appliance of the clustered system. As depicted in block 306, the stored commands are processed in a distributed fashion within a container-based control plane across the primary storage appliance and the first peer appliance.

Having described the above illustrative embodiments, several alternative embodiments and/or variations can be made and/or practiced. For example, in the clustered system 200a of FIG. 2a, a "split-brain" situation can occur due to a network failure, causing a loss of communications between at least some of the storage appliances 210.1, 210.2, 210.3, 210.4. In such a split-brain situation, if two or more of the storage appliances 210.1, 210.2, 210.3, 210.4 in separate partitions of the clustered system 200a continue processing storage management requests, then data conflicts can often result. In certain embodiments, the clustered system 200a can be configured such that greater than one-half of the storage appliances in a separate partition of the cluster (i.e., greater than or equal to three (3) storage appliances) are required to be in communication for that partition to be operational. In other words, if a separate partition of the cluster is to be operational, then it must maintain a "cluster quorum" of at least three (3) communicating storage appliances. For example, in the clustered system 200a (see FIG. 2a), if the primary appliance 210.1 loses network communications with the peer appliances 210.2, 210.3, 210.4, then the primary appliance 210.1 would stop receiving and/or processing storage management requests, because its partition of the cluster would not satisfy the cluster quorum of at least three (3) communicating storage appliances. However, because the remaining partition of the cluster consisting of the three (3) peer appliances 210.2, 210.3, 210.4 satisfies the cluster quorum, then, in response to a config state event or other suitable event or notification, one of the peer appliances 210.2, 210.3, 210.4 can be morphed or otherwise transformed from a peer appliance to a new primary appliance of the clustered system 200a.

It is noted that, if a split-brain situation occurs in which two (2) partitions of the cluster each have two (2) communicating storage appliances (i.e., neither partition satisfies the cluster quorum), then one of the storage appliances 210.1, 210.2, 210.3, 210.4 in the clustered system 200a can be allotted a "tie-breaker" vote to determine which partition is to continue processing storage management requests. For example, if a split-brain situation occurs that results in a first partition consisting of the storage appliances 210.1, 210.2 and a second partition consisting of the storage appliances 210.3, 210.4, then the storage appliance (primary) 210.1 (e.g., the lowest numbered storage appliance in the clustered system 200a) can be allotted the tie-breaker vote, thereby assuring that the first partition consisting of the storage appliances 210.1, 210.2 continues receiving and/or processing storage management requests, while the second partition consisting of the storage appliances 210.3, 210.4 stops receiving and/or processing storage management requests.

In addition, it was described herein that, having received a storage management request at the primary appliance 210.1 of the clustered system 200a, the management stack 212.1 writes or persists, to the central database 214.1, data pertaining to commands to be processed for satisfying the storage management request. It was further described herein that the replicated database on one of the peer appliances 210.2, 210.3, 210.4 can be synchronized with the central database 214.1 in a synchronous fashion, and the replicated databases on the other ones of the peer appliances 210.2, 210.3, 210.4 can be synchronized with the central database 214.1 in an asynchronous fashion. In certain embodiments, the clustered system 200a can leverage the use of transactions to avoid data corruption following a storage appliance failure. For example, a transaction can consist of a series of steps that involve specific tasks such as (i) creating an object or entity in a data path of the clustered system 200a, (ii) creating an object or entity in a platform of the clustered system 200a, (iii) creating an object or entity on the peer appliance 210.2 or the peer appliance 210.3, and so on. The transaction can also require certain domain objects (e.g., LUNs, LVs) to be created or updated, thereby affecting the domain state of the clustered system 200a. The orchestration of such a transaction can include creating a state machine that includes the specific tasks assigned to the series of steps and maintaining orchestration metadata that tracks the execution of the state machine. The clustered system 200a can leverage the use of such a transaction by writing or persisting, to the central database 214.1 at each step transition of the state machine, both the orchestration metadata for the state machine and the current domain state of the clustered system 200a, thereby maintaining synchronization between the orchestration metadata and domain state information. As a result, if the primary appliance 210.1 of the clustered system 200a experiences a failure while executing the state machine, then one of the peer appliances 210.2, 210.3, 210.4 (e.g., the peer appliance 210.2 that includes the sync replicated database 214.2) can continue the execution of the state machine at the step where the failed appliance left off, using the orchestration metadata and domain state information stored in its replicated database.

It was also described herein that the storage appliances 210.1, 210.2, 210.3, 210.4 of the clustered system 200a can include control plane containers 216.1, 216.2, 216.3, 216.4, respectively, which are configured to implement at least command orchestration services and command processing services on the respective storage appliances 210.1, 210.2, 210.3, 210.4. In certain embodiments, each of the control plane containers 216.1, 216.2, 216.3, 216.4 can be upgraded independent of both the data path and the platform of the clustered system 200a. In other words, a build process for each control plane container can be separate and distinct from build processes for the data path and the cluster platform. Each of the control plane containers 216.1, 216.2, 216.3, 216.4 of the respective storage appliances 210.1, 210.2, 210.3, 210.4 can therefore be independently deployed or re-deployed within the clustered system 200a. Further, because the control plane containers 216.1, 216.2, 216.3, 216.4 are independent of both the data path and the cluster platform, the storage appliances 210.1, 210.2, 210.3, 210.4 can continue servicing storage IO requests while the control plane containers 216.1, 216.2, 216.3, 216.4 are being deployed or re-deployed. In addition, each of the control plane containers 216.1, 216.2, 216.3, 216.4 can be provided with a different allocation of storage processing and/or memory resources within the respective storage appliances 210.1, 210.2, 210.3, 210.4.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a file system, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by address. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of a clustered storage system, comprising:
storing, in a central database of a primary appliance of the clustered storage system, one or more commands for satisfying one or more storage management requests;
synchronously replicating the central database to a first peer database of a first peer appliance of the clustered storage system; and
performing distributed processing of the stored commands within a container-based control plane across at least the primary appliance and the first peer appliance of the clustered storage system.

2. The method of claim 1 further comprising:
receiving the one or more storage management requests at a global management IP address of the primary appliance.

3. The method of claim 2 wherein the performing of the distributed processing of the stored commands within the container-based control plane includes accessing, by the first peer appliance via the global management IP address, at least some of the one or more commands stored in the central database of the primary appliance.

4. The method of claim 1 wherein each of the primary appliance and the first peer appliance includes a control plane container having command processing services implemented therein, wherein the control plane container of the primary appliance further has command orchestration services implemented therein, and wherein the performing of the distributed processing of the stored commands within the container-based control plane includes orchestrating, by the command orchestration services, execution of at least some of the stored commands across the control plane container of the primary appliance and the control plane container of the first peer appliance.

5. The method of claim 1 further comprising:
asynchronously replicating the central database to a second peer database of a second peer appliance of the clustered storage system.

6. The method of claim 5 further comprising:
detecting a failure of the primary appliance.

7. The method of claim 6 further comprising:
in response to the failure of the primary appliance, promoting the first peer appliance to a role of a first new primary appliance.

8. The method of claim 7 further comprising:
having promoted the first peer appliance to the role of the first new primary appliance, spinning up at least first command orchestration and processing services within a first control plane container of the first peer appliance.

9. The method of claim 8 further comprising:
synchronously replicating the first peer database of the first peer appliance to the second peer database of the second peer appliance.

10. The method of claim 9 further comprising:
detecting a failure of the first peer appliance.

11. The method of claim 10 further comprising:
in response to the failure of the first peer appliance, promoting the second peer appliance to a role of a second new primary appliance.

12. The method of claim 11 further comprising:
having promoted the second peer appliance to the role of the second new primary appliance, spinning up at least second command orchestration and processing services within a second control plane container of the second peer appliance.

13. A system, comprising:
a memory; and
processing circuitry configured to execute program instructions out of the memory to:
store, in a central database of a primary appliance of a clustered storage system, one or more commands for satisfying one or more storage management requests;
synchronously replicate the central database to a peer database of a peer appliance of the clustered storage system; and
perform distributed processing of the stored commands within a container-based control plane across at least the primary appliance and the peer appliance of the clustered storage system.

14. The system of claim 13 wherein the primary appliance has an associated global management IP address, and wherein the primary appliance is configured to receive the one or more storage management requests at the global management IP address.

15. The system of claim 14 wherein the peer appliance is configured to access the central database of the primary appliance via the global management IP address.

16. The system of claim 13 wherein the primary appliance includes a first control plane container, and the peer appliance includes a second control plane container.

17. The system of claim 16 wherein each of the first control plane container and the second control plane container is configured to run within a separate virtual machine.

18. The system of claim 16 wherein the first control plane container is configured to implement at least command orchestration and processing services, and wherein the command orchestration and processing services of the first control plane container are configured to run within the same virtual machine.

19. A computer program product including a set of non-transitory, computer-readable media having instructions that, when executed by storage processing circuitry, cause the storage processing circuitry to perform a method comprising:
storing, in a central database of a primary appliance of a clustered storage system, one or more commands for satisfying one or more storage management requests;

synchronously replicating the central database to a peer appliance of the clustered storage system; and performing distributed processing of the stored commands within a container-based control plane across at least the primary appliance and the peer appliance of the clustered storage system.

20. The computer program product of claim 19 wherein the method further comprises:

receiving the one or more storage management requests at a global management IP address of the primary appliance, wherein the performing of the distributed processing of the stored commands within the container-based control plane includes accessing, by the peer appliance via the global management IP address, the one or more commands stored in the central database of the primary appliance.

* * * * *